United States Patent [19]

Klumpp

[11] 3,863,265

[45] Jan. 28, 1975

[54] METHOD AND APPARATUS FOR INSERTING DATA RECORDS ON MAGNETIC TAPE

[75] Inventor: Marlin K. Klumpp, Ann Arbor, Mich.

[73] Assignee: Sycor, Inc., Ann Arbor, Mich.

[22] Filed: Feb. 9, 1973

[21] Appl. No.: 330,941

[52] U.S. Cl. .......................... 360/48, 360/40, 360/50, 360/62, 360/72

[51] Int. Cl. .... G11b 27/22, G11b 5/02, G11b 27/88

[58] Field of Search ........... 179/100.2 B, 100.2 MD, 179/100.2 K, 100.2 S; 340/174.1 B, 174.1 K, 174.1 C; 360/48, 40, 50, 62, 72

[56] References Cited

UNITED STATES PATENTS

| | | | |
|---|---|---|---|
| 3,444,541 | 5/1969 | Irwin | 179/100.2 B |
| 3,580,994 | 5/1971 | Kosaka | 179/100.2 B |
| 3,634,835 | 1/1972 | Houston | 340/174.1 B |
| 3,646,260 | 2/1972 | Bolger | 179/100.2 B |
| 3,647,951 | 3/1922 | Rose | 179/100.2 B |
| 3,656,125 | 4/1972 | Kanda | 340/174.1 B |

*Primary Examiner*—Alfred H. Eddleman
*Attorney, Agent, or Firm*—Prica, Heneveld, Huizenga & Cooper

[57] ABSTRACT

A threshold detector is coupled to a "write" head in a recording apparatus to detect the leading edge of the first transition of previously recorded data and provide a control signal therefrom. A control circuit coupled to the threshold detector switches the recording apparatus to the "write" or recording mode of operation immediately upon the detection of the predetermined threshold voltage from the write head so that the same head then immediately switches its operation and operates to record new data information directly and accurately over the previously recorded data. By utilizing this method, new records can automatically be inserted accurately in a particular segment of a previously recorded tape, such as in a recording format for digital information which employs segments of recorded information as discreet records, with an inter-record gap between each record, with each record including a preamble immediately followed by the data information.

15 Claims, 4 Drawing Figures

METHOD AND APPARATUS FOR INSERTING DATA RECORDS ON MAGNETIC TAPE

BACKGROUND OF THE INVENTION

The present invention relates to a recording method and apparatus for accurately inserting new records in specific previously recorded segments at any given point along a length of recording tape.

In certain prior recording formats for digital recorded tape cassette systems, each record was preceded by a start-of-record mark consisting of a single recorded transition followed by a 36-bit gap, after which the record commenced. The start-of-record mark was read and employed as a synchronization signal to facilitate the insertion a predetermined timed interval after such mark was read, of new record information over the old record, to effect re-recording of that part of the tape. The fixed 36-bit gap allowed sufficient time for the start-of-record mark to be moved past the recording head and detected by the latter and then a predetermined interval later, the recorder apparatus could be switched to the write mode of operation to apply new recording information to the tape, over the old record.

Recently, the European Computer Manufacturers Association (E.C.M.A.), the International Standards Organization (I.S.O.) and the American National Standards Institute (A.N.S.I.) have adopted universally acceptable standards for data interchange using 3.81 mm magnetic tape cassettes. The standards include a new format which eliminates the use of the previous start-of-record mark followed by a gap between the mark and the recorded data. The new standards thereby prevent the use of the previous system for recording new record information on a previously recorded tape in an accurate fashion. In the new format, a universal preamble is followed immediately by the data, with no gap between the two. This makes it impossible to insert a new record in the same manner as before, or in a somewhat analogous manner, such as or on timed response to the passing of the preamble past the recording head or past a typical read-after-write head (or gap, in a double-gap head) used for data verification and error checking, since in either case the head or gap which does the writing will be well into the data information by the time the preamble has moved past the head or gap used for reading, and has been so identified.

SUMMARY OF THE INVENTION

In order to accurately insert new records, therefore, a new system has been developed which utilizes the write head for detecting the first transition of the preamble and applying the detected signal to a threshold detector. As a predetermined signal level is reached, the tape apparatus is controlled to immediately record a new preamble which is immediately followed by the new record. In the new record-inserting method, therefore, the preamble as well as the old record is replaced with a new preamble and record.

It is an object, therefore, of the present invention to provide a recording method suitable for inserting new records in place of old records, following a recording format utilizing a preamble immediately preceding the recorded data.

Another object of the present invention is to provide a method of, and apparatus for, inserting new records accurately over old records by employing the writing head to detect the start of the old record. Another object of the present invention is to provide an improved record-inserting method and apparatus which utilizes the write head and a threshold detector to provide a control signal upon the detection of a predetermined level of the first transition of a record and provide a control signal therefrom utilized to initiate the re-recording of the record.

Still a further object of the present invention is to provide an electrical circuit coupled to the writing head of a data recording apparatus and responsive to the leading transition of a record to accurately insert new information in place of the previously recorded information.

These and other objects of the present invention will become apparent upon reading the following specification together with the accompanying drawings in which:

DETAILED DESCRIPTION OF THE PREFERRED EMBODIMENT

Figures 1, 2, 3A, 3B:
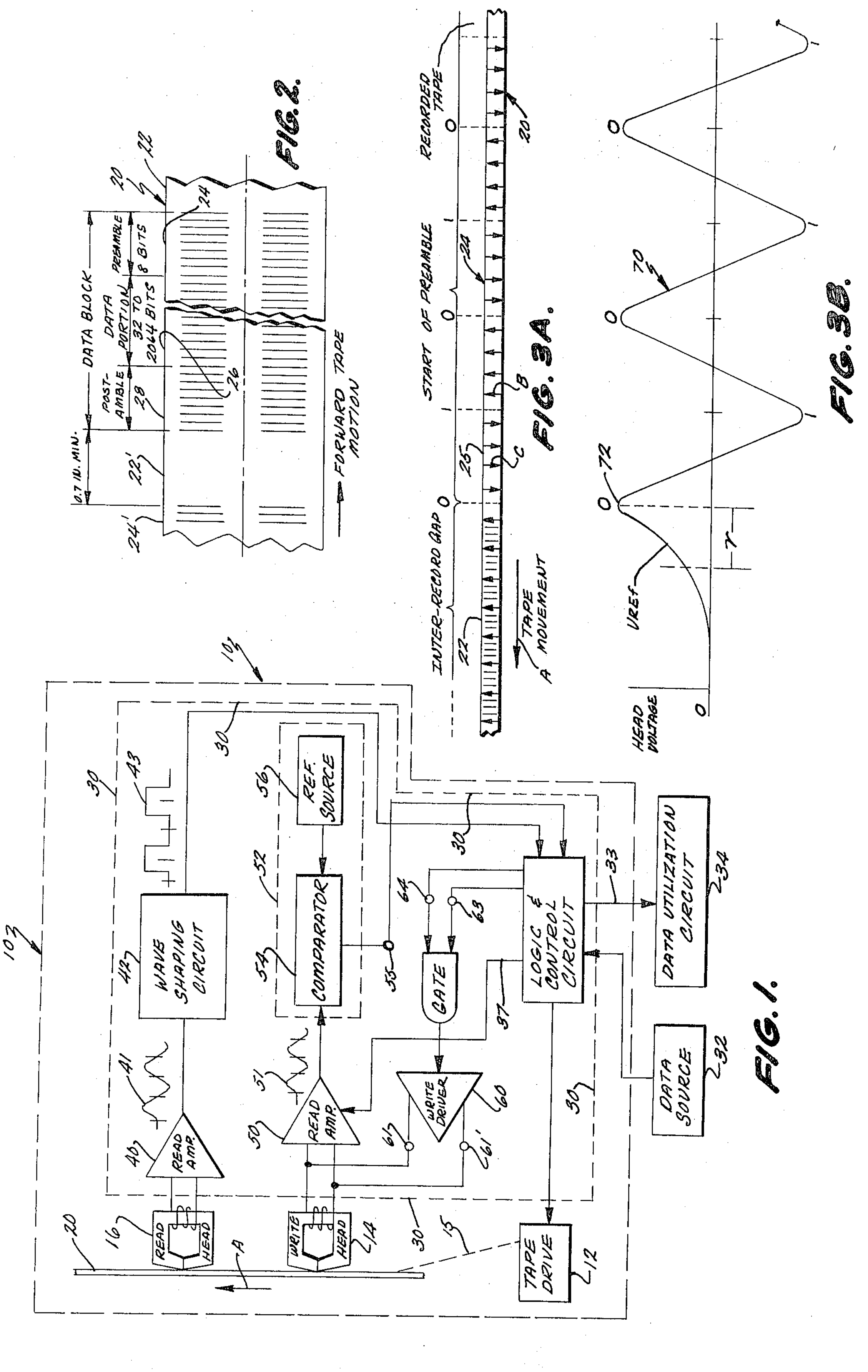
FIG. 1 is an electrical circuit diagram partially in block and schematic form illustrating the method and circuitry employed in practicing the present invention.
FIG. 2 is a pictorial diagram of an enlarged segment of magnetic tape prerecorded in the recently adopted standardized format.
FIG. 3A is a diagrammatic view of a segment of the tape shown in FIG. 2.
FIG. 3B is a diagrammatic view illustrating the electrical signal developed from the write head shown in FIG. 1 in response to the tape segment shown in FIG. 3A.

Before discussing the circuitry of FIG. 1 in detail, it is helpful to examine the recording format recently adopted by E.C.M.A./I.S.O./A.N.S.I. The format as shown on tape 20 in FIG. 2 includes an inter-record gap 22 between individual records, i.e., discreet sequential areas or segments of recorded information. The gaps range between a minimum of 17.8 mm to 500mm. Immediately following an inter-record gap is a recorded segment or record comprising a preamble 24 which is the digital code 01010101 and which is followed immediately by the data 26 of the record itself (i.e., the information). The record can range from 32 to 2,064 bits of information. The data is followed by a postamble 28 comprising eight bits which is then followed by another inter-record gap 22' preceding the preamble 24' for the next record. The preamble is in every case identical and immediately precedes the data record.

With this format, the read-after-write head which can be a separate and distinct head or merely a separate magnetic gap in a dual gap head, which is of necessity, located downstream from the writing head or gap, cannot read the preamble sufficiently soon to control the reinsertion of a new data record over the old record. This results since there is no spacing between the preamble and the data in the record, and by the time the preamble is read, the write head is positioned well into the data. In order to insert records employing this new format, therefore, it is necessary either to stop and reverse the tape a predetermined distance with extreme accuracy after detection of the preamble, or to employ additional components, at additional expense and complexity, such as for example, another read head located upstream from the write head.

The system shown in FIG. 1 represents a new approach which can be employed with the recently adopted recording format (and others) to successfully and accurately re-record a tape cartridge by recording a new record directly over the old record without reversing and restarting the tape. Before discussing the operation of the system shown in FIG. 1, a brief description of the circuit elements contained therein is presented.

Referring now to FIG. 1, there is shown a tape recording-playback apparatus 10 suitable for cassettes or other types of tape sources, including a tape drive unit or transport 12 adapted to move magnetic tape 20 past a write head 14 and then past a read head 16 or past write and read gaps in a dual gap head, the read head or gap being positioned in spaced relationship from the write head or gap, downstream therefrom with respect to the direction of motion of tape 20, indicated by arrow A in the figure. Transport 12 can be any commercially available unit adapted to utilize a conventional Philips cassette, transporting the tape at approximately 12.5 inches per second during reading and writing. The transport is mechanically coupled to the tape 20 as by means of a capstan or other suitable drive menas, represented schematically by the dashed line 15 extending between the transport and the tape.

Apparatus 10 includes a tape controller 30 shown in dashed lines in the figure and which includes the circuitry for controlling the tape drive mechanism as well as applying data to the write head 14 from a data source 32 which can be any number of commercially used units such as a computer, prerecorded tape, or other data generating sources such as keyboards or the like. The controller also is coupled to the read head 16 for transferring information stored in tape 20 to a data utilization circuit 34 which, like source 32, can be any number of commercial units including another computer, numerically controlled machine tools or process controls, inventory control systems or the like.

Controller 30 includes a logic and control circuit 36, which may be a conventional type of switching network design, to selectively couple the data signals supplied thereto between the heads and the input and output devices as well as control the different modes of operation of apparatus 10 upon command by appropriate switching The particular circuitry required for this component is easily within the state of the art and in large part can be selected from existing circuits which are in use in similar applications; for example several tape-controlling circuits of this general nature are presently in use in commercial tape recorder devices, and could be employed with very minor modification to provide the essentially standard types of switching functions required.

Controller 30 additionally includes a read amplifier 40 coupled to read head 16 for amplifying detected recorded information and applying the information to a wave shaping circuit 42 which converts the generally sinusoidal signals 41 into square wave data signals 43 as seen in FIG. 1. Data signals 43 are then applied to the logic and control circuit 36 which feeds them to the data utilization circuit 34 via interconnecting conductor(s) 33.

It is to be noted here that the present invention recognizes and makes use of the fact that the write head or gap 14, although specifically designed and typically used only to apply magnetizing fields to record the tape 20 as it passes thereby, can nonetheless be utilized as a reading head to detect prerecorded information on the tape. This typically un-noticed and unused capability is utilized in a highly effective and novel manner in accordance with the invention to solve the problem set forth above, i.e., the accurate insertion or re-recording of a new or changed record directly over that which was previously recorded. That is, in accordance with the present invention, the write head or gap is used to read the tape, to thereby detect the presence at the write head of the preamble in the record which is to be changed. To facilitate the recovery of such information from the write head, a read amplifier 50 has its input terminals coupled to the write head 14 and amplifies signals detected by the write head when not operated in a recording mode. The generally sinusoidal signals 51 are applied to a threshold detector circuit 52 which, as seen in FIG. 1, includes a comparator 54 and a reference voltage souce 56. The output terminal 55 of a comparator 54 is coupled to the logic and control circuit 36.

Controller 30 additionally includes a write driver 60 having its output terminals 61, 61' coupled to the writing head for applying signals which actuate the head to record data information supplied from source 32 on tape 20 as it passes the head. An AND gate circuit 62 has first terminal 63 for receiving an enabling signal from the logic and control circuit 36, whereupon the gate will pass data to driver 60 from gate input terminal 64, which is coupled to the data source 32 through appropriate gating or switching in the control circuit 36. Thus, the driver 60 will be actuated to apply data recording signals to the write head only when an enable signal is applied to terminal 63 of the AND gate from the logic and control circuit 36. During recording, amplifier 50 may be disabled as by an appropriate control signal from circuit 36, applied to the amplifier, for example, on a conductor 37; however, it is to be noted that such disabling is not strictly necessary, so long as the control circuit 36 is not responsive to signals from the comparator during recording operation. If not disabled, amplifier 50 will probably be situated, but this is not necessarily harmful or damaging. As will be understood, circuit 36 should include a gate or other suitable logic or switching circuitry which responds to a control detector to provide the enabling signal applied to gate 62, as well as a disabling signal applied to amplifier 50, if disabling is deemed necessary. Recording is accomplished by switching the controller to a recording mode of operation during recording of previously unrecorded tape or is accomplished automatically when recording over previously recorded tape in accordance with the present invention as now described.

OPERATION

Referring now to FIG. 3A, there is shown a portion of the tape 20 including the recorded preamble. Aligned below the tape in relationship to the information recorded on the tape is FIG. 3B, showing a wave form 70 illustrating the output voltage from the read amplifier 50 shown in FIG. 1. As noted earlier, tape 20 includes the inter-record gap 22, which separates sequentially recorded individual records. Information is recorded on the tape in phase encoded form such that data 1 signals are sections of tape magnetized in a first direction illustrated by arrows B, while data "O" signals are sections of tape magnetized in the opposite sense as indicated by arrows C. The transition between the two different magnetized sections provides the detected signal employed to represent the recorded information. To re-record over a previously recorded segment, the tape is cued to the gap preceding the record to be changed as by means of automated i.e., programming search routines, or by means of a counter associated with the tape apparatus, or other suitable means, and control circuit 36 is actuated to the re-recording mode, so as to be responsive to the amplifier 50 and the threshold detector circuit 52.

The tape drive is then started, and the part of the tape carrying the record which is to be changed approaches the write head, which is then in a reading mode of operation selected by the operator when the desired record is cued for reprogramming. As the first bit 25 of the preamble 4 in the selected record approaches the write head, the output voltage of amplifier 50 increases toward a positive peak 72 as seen on wave form 70. It is to be particularly noted that the voltage from amplifier 50 actually begins to rise before the first bit in the preamble becomes directly aligned with the gap of the write head, as a result of the tape magnetization characteristics. This appears to have been unappreciated heretofore, at least in so far as the use of such characteristics for anticipatory detection of recorded bits, as is true in accordance with this invention. That is, the magnetization characteristics of the tape are changed in varying amounts in the area surrounding the actual recorded transition, as well as at the transition itself, where magnetization is very direct and strong. The area of changed magnetization surrounding the actual transition can be detected in advance of the transition itself to provide anticipatory sensing of the transition, and this phenomenon is central to the concept of this invention.

The signal represented by wave form 70 is applied to comparator circuit 54 which also receives a reference voltage $V_{ref}$ from source 56. As seen in FIG. 3B, the reference voltage is selected to correspond to an amplitude of wave form 70 located at a position in advance of the peak 72. Comparator 54 will respond to coincidence of the amplitude of the signal 70 with $V_{ref}$ to generate a control signal at an output terminal 55 thereof at a time when the tape is positioned with the leading bit 25 of the preamble slightly in advance (i.e., up stream) of the write head. This time interval is represented in FIG. 3B by the symbol $\gamma$ and permits the logic and control circuit 36 to respond to the receipt of the control signal from comparator 54 by actuating the write driver 60 slightly prior to or at essentially the same instant that the peak 72 is in registry with the write head, to thereby initiate the recording of the new record at that instant, commencing with the standardized preamble, from data source 32.

Thus, the new preamble will be written essentially directly over the old preamble, followed by the new record. Since the interval $\gamma$ corresponds to a tape movement of up to only ten microns, depending on the reference voltage selected, the slight forward shifting of the new record is insignificant since the inter-record gap is at least 17.8 mm and frequently more. As the tape continues past the write head, therefore, a new preamble accompanied by a new record from source 32 is written over the old record, thereby completing the desired "insertion" or reprogramming of the record involved.

It should be noted that in the preceding description words such as "recording head," "read head," "write head," "gap," etc. are all used in varying senses and varying connotations. It should be understood, however, that in the following claims the words "gap" and "head" mean substantially the same thing, i.e., the recording or reproducing instrumentality, whether it be a particular gaping single multi gap head unit, a single head in a multi head arrangement, or a single multi function gap in a single head. Terms such as "read" and "write" should be understood as denoting the primary purpose for which a head or gap is intended to be used in a given application, or at least a major such purpose, and not necessarily the purpose for which it was conceived or devised by its manufacturer, or the purpose which it may be most capable of fulfilling in an actual sense.

It will become apparent to those skilled in the art that many applications and modifications of the present invention can be made. The reprogramming method and apparatus is applicable to reel-to-reel tape systems, as well as to cassettes and other types of tape systems. The system will also have application to recording formats different than that described in the preferred embodiment. Other types of detectors may be employed in place of the threshold detector shown. These and other modifications of the preferred embodiment will, however, fall within the scope and spirit of the present invention as defined by the appended claims.

The embodiments of the invention in which an exclusive property or privilege is claimed are defined as follows:

1. A method of demonstrating the presence of a predetermined recording condition on a recording medium, comprising the steps of:

sensing the recording medium to detect the presence of said recording condition and producing signals having a level representative of such condition when the same is detected;

providing a reference signal having a level representative of the predetermined signal condition desired to be indicated;

comparing the level of the sensed signals with that of the reference signal;

and generating a control signal when the level of the sensed signal bears a predetermined relationship to the level of the reference signal.

2. A method of inserting data on a recording media in place of data previously recorded thereon in a format which includes a preamble immediately followed by the data record, comprising the steps of:

transporting the recording media past a detecting head to produce signals;

monitoring the signals from said head as the recorded media is transported thereby;

detecting a predetermined signal condition from the leading edge of the preamble of previously recorded information during said monitoring step; and initiating the recording of new information on the media in response to the detection of said predetermined signal condition.

3. In a tape recording-playback system including a tape transport for waving tape adjacent a recording head, wherein the tape includes segments with recorded signals and non-recorded gaps of tape separating the recorded segments, a method of controlling the recording of new signals over a prerecorded tape segment comprising:

detecting prerecorded signals as a segment of tape carrying such signals reaches the recording head;
comparing the leading portion of the detected prerecorded signals with a reference;
generating a control signal responsive to the coincidence of the compared signal and reference; and
applying new information signals from a source of such signals to the recording head in response to said control signal to record the new information signals over the previously-recorded signals.

4. In a tape recording apparatus, circuit means responsive to recorded information on a tape replayed on said apparatus to control the recording of new information on said tape in predetermined relationship to the previously recorded information, said circuit comprising:

a tape head for detecting recorded information on the tape as it is transported adjacent said head;
an amplifier coupled to said head for providing output signals representative of information recorded on the tape;
a detector circuit coupled to said amplifier for detecting a predetermined signal and providing an output signal in response thereto; and
control means coupled to said detector and adapted to be coupled to a source of information to be recorded, said control means responsive to said output signals from said detector to supply signals from said source to said tape head for recording when said predetermined signal is detected.

5. The circuit as defined in claim 4 wherein said detector circuit comprises a threshold detector for detecting a predetermined level of the signals from said amplifier.

6. The circuit as defined in claim 5 wherein said threshold detector comprises a comparator and a source of reference voltage, said comparator having one input terminal coupled to said amplifier and a second input terminal coupled to said source of reference voltage, said comparator further including an output terminal for providing a control signal thereto upon the coincidence of the signal voltage from said amplifier and the reference voltage from said source.

7. A tape recording-playback apparatus including a tape transport for moving tape lengthwise across a recording head, said tape including segments having information recorded therein with non-recorded gaps of tape separating such segments, a circuit for controlling the recording of new information from a source of such information over a prerecorded tape segment, comprising:

amplifying means coupled to the recording head to amplify signals produced thereby as a segment of said tape is moved past said head and is sensed thereby;
detection means coupled to said amplifier for detecting a predetermined amplitude of the leading signal sensed from a segment of prerecorded information and for providing a control signal responsive to the detection thereof;
selective coupling means adapted to receive signals from a source of signals representing information to be recorded, and to selectively couple such signals to the recording head; and
control means coupled to said detection means and to said selective coupling means and responsive to the control signal provided by said detection means when said predetermined amplitude signal is detected to actuate said selective coupling means to couple the information signals from said source thereof to the recording head, whereby such signals are recorded over the segment of previously recorded signals.

8. The system as defined in claim 7 wherein said detection means comprises a comparator and a source of reference voltage, said comparator having one input terminal coupled to said amplifier and a second input terminal coupled to said source of reference voltage, said comparator further including an output terminal for providing a control signal thereto upon the coincidence of the signal voltage from said amplifier and the reference voltage from said source.

9. The system as defined in claim 7 wherein said selective coupling means comprises a second amplifier and a gate circuit, said second amplifier having an output terminal coupled to the recording head and an input terminal coupled to said gate circuit, said gate circuit having an input terminal adapted to be coupled to a source of signals to be recorded and a control terminal coupled to said control means, said gate circuit actuated by an enabling signal from said control means to couple signals to be recorded to said second amplifier.

10. A method of positioning magnetically recorded information upon a recording media having previously-recorded transitions thereon, comprising the steps;

moving the media relative to a magnetic head means capable of producing electrical signals in response to recorded magnetic transitions, so as to cause a given one of said previously-recorded transitions to approach said head means;
monitoring the signals produced by said head means as said one transition approaches and comes into registry with the head means;
using a predetermined characteristic of the parting of said signal representing media at least slightly down-stream of the main part of said one transition as a switching signal to position the point on said media where information is subsequently recorded, relative to said one transition.

11. The method as recited in claim 10, wherein said magnetic head means is used as the recording head which makes said subsequent recording of information, in addition to being used to produce said signals in response to previously, recorded magnetic transitions.

12. The method as recited in claim 10 as used with magnetic recording tape as said media.

13. The method as recited in claim 10, wherein said switching signal is used to position said media such that said point where information is subsequently recorded is the same point where at least part of said one transition is recorded, said subsequent recording thus occurring over at least said part of said transition.

14. Means for positioning the place on a magnetic recording media where information is subsequently recorded, relative to previously-recorded magnetic transitions, comprising:

transducing means for producing electrical signals in response to proximal movement of magnetic recording media having magnetic transitions recorded thereon, and as a given such transition approaches said means during such movement;

drive means for effecting such movement of said media; and monitoring means for receiving said electrical signals produced during such movement and for enabling a recording means in response to a predetermined characteristic of said signals representing the portion of said media located at least slightly downstream of said given transition, such, that said recording means records information on said media at a predetermined point relative to said given transition.

15. A method of making changes in a magnetic recording, by use of recording apparatus having a write head or gap for recording purposes and a read head or gap for reproducing purposes, comprising: using said write head or gap in part as a reading device, to produce electrical signals in response to proximal movement of said recording with respect to said write head or gap and using at least a portion of said electrical signals to cause switching of said write head or gap to a write mode of operation in response to predetermined conditions of said signals.

* * * * *

UNITED STATES PATENT OFFICE
CERTIFICATE OF CORRECTION

PATENT NO. : 3,863,265

DATED : January 28, 1975

INVENTOR(S) : Marlin K. Klumpp

It is certified that error appears in the above–identified patent and that said Letters Patent are hereby corrected as shown below:

Column 3, line 27,
"menas" should be ---means---;

Column 3, line 49;
After "switching" insert ---.---;

Column 4, line 68;
The numeral "1" should be in quotation marks.

Column 6, line 9;
"gaping" should be ---gap in a---;

Column 6, line 66;
"waving" should be ---moving---;

Column 8, line 52;
Delete ", (comma)";

Column 9, line 10;
Delete ", (comma)" after "such";

Signed and Sealed this

*second* Day of *September 1975*

[SEAL]

*Attest:*

RUTH C. MASON
*Attesting Officer*

C. MARSHALL DANN
*Commissioner of Patents and Trademarks*